April 9, 1963 L. R. BROWN 3,084,453

CODING APPARATUS

Filed Aug. 31, 1960 2 Sheets-Sheet 1

INVENTOR.

Laurence R. Brown

BY

ATTORNEYS.

April 9, 1963 L. R. BROWN 3,084,453

CODING APPARATUS

Filed Aug. 31, 1960 2 Sheets-Sheet 2

INVENTOR.
Laurence R. Brown,
BY
Paul & Paul
ATTORNEYS.

3,084,453
CODING APPARATUS
Laurence R. Brown, Berwyn, Pa., assignor, by mesne assignments, to Drexel Dynamics Corporation, Philadelphia, Pa., a corporation of Pennsylvania
Filed Aug. 31, 1960, Ser. No. 53,134
7 Claims. (Cl. 35—2)

Figure 1:
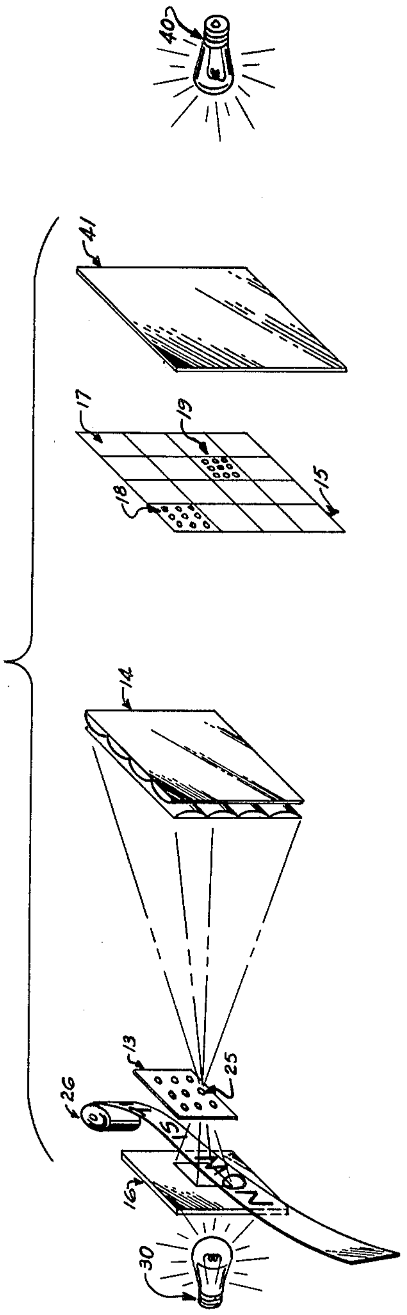

This invention relates to encoding means and more particularly it relates to an optical encoder.

It is desirable to provide identification tags with coded information, or to otherwise provide for coding information so that a large number of possible variations is required for decoding, and wherein special decoding equipment is necessary. This equipment should be compatible with camera techniques and also should be simple and low in cost for commercial applications.

Accordingly it is an object of this invention to provide novel encoding equipment.

A further object of the invention is to provide versatile means for supplying information in a difficult to decode pattern.

Another object of the invention is to provide coding means whereby an entire message may be hidden in a photographic image.

In accordance with the invention, an optical system is used with one lens set for breaking up an image into a myriad of small segments and another lens set is used for intermixing segments from the message in a complex pattern. The latter lens set is capable of rearranged geometric patterns for providing a large number of various combinations of coded information.

The invention together with further objects and features of advantage will be explained with reference to the drawing in which FIG. 1 sets forth diagrammatically a coding system embodying the invention, and in which FIGS. 2–5 are diagrammatic illustrations used to explain the manner in which the system of FIG. 1 operates.

As exemplified in FIG. 1, two lens arrays, one an encoding plate lens array 13 and the other a lenticular lens array 14 are used for optical communication between the coded message bearing surface 15 and the message screen 16 in either direction.

Lens array 14 comprises a large number of small lenses, formed in this example by crossed cylindrical lenses, and termed lenticulars. The cylindrical lenses are typically fifty to the inch and thus will provide about twenty-five hundred discrete message segment areas 17 per square inch on the message bearing medium 15. Each coordinate intersection will essentially serve as a spherical lens focusing at a point such as 18 on the coded message medium 15.

The lenticular lens array 14 and coded message medium 15 are quite sensitive to the direction from which an image is derived. Thus considering messages derived from nine points within the coding plate lens array 13, there will be formed a similar dot pattern 19 in each segment on the coded message bearing medium 15 (which may be a photographic film). Thus, by choosing an encoding pattern on the code plate lens array 13, a corresponding encoded pattern will result on the coded message bearing medium 15.

The coding plate lens array 13 is formed in accordance with this invention as a lens plate, which in simplest form comprises an array of pinholes. Thus by proper geometric arrangement the entire message area of lenticular lens array 14 views through one lens or pinhole, such as 25, of the array 13 a portion of a message at screen 16 presented such as from film roll 26.

Then, dependent upon the array of lenses or pinholes in the coding plate lens array 13, it may be seen that the entire message is multiplexed in a coded fashion in the dot pattern throughout the surface of the coded message bearing medium 15. Some portions of the uncoded message on screen 16 may be caused to overlap on the coded message medium 15, dependent upon the geometry and code pattern used in the encoding plate lens array 13.

A coded message may be formed by projecting light from lamp 30 through screen 16, which serves as a light source substantially in the plane of the uncoded message from roll 26. The projected image is formed upon the coded message bearing surface 15 by action of encoding plate lens array 13 and lenticular lens array 14. The coded message bearing surface 15 may be removed and later repositioned by indexing means (not shown).

For viewing and decoding the coded message at plane 15, the lamp 40 and diffuser or collimator 41 is used to project the coded message back through the lenticular and coding lens arrays 14 and 13, respectively, so that it may be viewed in reconstituted form on the screen 16.

Referring now to FIGS. 2–5, these figures will be used to describe more fully how a message is coded and then decoded, using a method similar to that employed in the system of FIG. 1. Later, the description of FIGS. 2–5 will be related to the system shown in FIG. 1. To facilitate the relationship, reference numerals have been used in FIGS. 2–5 which are similar to those used in FIG. 1 increased by 100. For example, the encoding plate lens array 113 of FIG. 2 corresponds to the encoding plate lens array 13 in FIG. 1; the lenticular lens array 114 of FIG. 2 corresponds to the lenticular lens array 14; the coded message bearing medium 115 in FIG. 2 corresponds to the coded message bearing medium 15; etc.

Figures 2, 3, 4, 5:
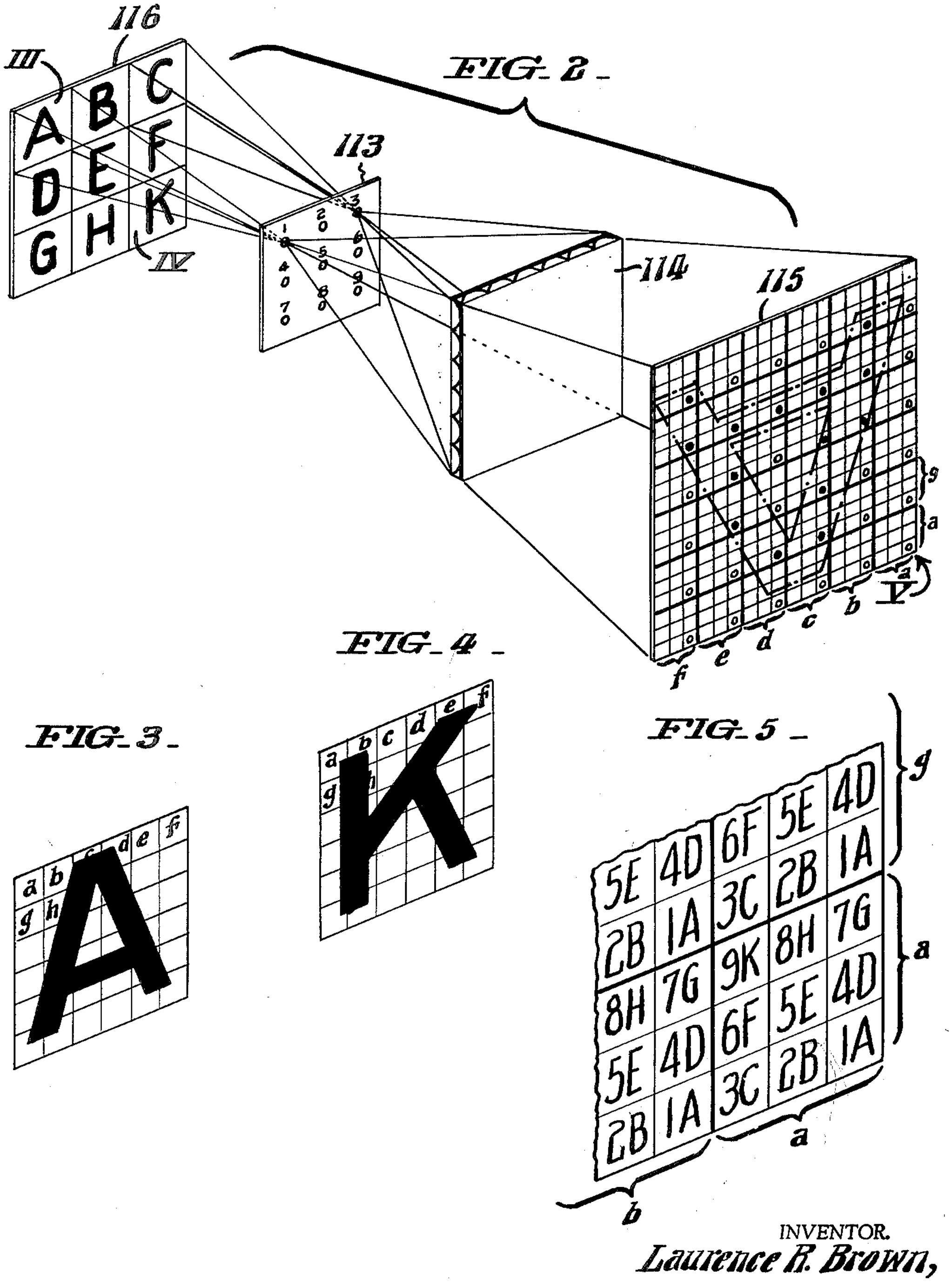

Referring now to FIG. 2, and assuming a light source to be positioned in back of the message screen 116, the encoding plate lens array 113 is so positioned that the pinhole or lens No. 1 focuses the divisional portion of 116 represented by the block containing the capital letter A on the entire area of the lenticular lens array 114. This is indicated in FIG. 2 by the ray lines traced from the four corners of divisional block A through the lens No. 1 to the four corners of the lenticular lens array 114. The letter A would, of course, be inverted on the lenticular lens array 114.

Assume for the moment that the lenticular lens array 114 is omitted from the combination shown in FIG. 2, and that divisional block A of the message screen 116 is focused by the lens No. 1 on the coded message receiving medium 115. The capital letter A would then appear on 115 in inverted position and as a solid character. Similarly, the capital letter B of divisional block B of 116 would be focused by the pinhole or lens No. 2 of the encoding plate lens array 113 on the message receiving medium 115 and would appear on 115 as a solid character in inverted position superimposed upon the solid letter A. In like manner, the divisional blocks containing the capital letters C, D, E, F, G, H, and K would each be focused by lenses 3, 4, 5, 6, 7, 8, and 9, respectively, on the coded message receiving medium 115 and would appear as solid characters in superimposed positions, one upon the other.

Attention is called at this point in the discussion to the fact that by changing the number and/or arrangement of lenses in the small lens array in code plate 113, the information received at the message receiving plane 115 would be changed. To mention just one example to illustrate this point, suppose an additional lens were to be placed in the first column of the code plate 113 half way between the lenses 1 and 4. If this were done, then the lower part of the letter A and the upper part of the letter D would appear at the message receiving plane 115, inverted, of course. This would result since the additional lens would focus on the message receiving plane 115 that portion of the message screen 116 occupied by the lower half of the A block and the upper half of the D block.

It will be seen then that information on surface 116 is focused on the message receiving plane 115 in superimposed fashion in a manner dependent on the number and the arrangement of the lenses in the lens array in the code plate 113.

Consider now the effect of the lenticular lens array 114 disposed in the position shown in FIG. 2, between the code plate lens array 113 and the message receiving plate 115. In FIG. 2, the lenticular lens array 114 is illustrated as composed of six cylindrical lenses vertically-disposed and six cylindrical lenses horizontally disposed, forming a total of 36 spherical lenses in a six-by-six pattern. Actually in practice, the lenticular lens array 114 would be comprised of many more lenses than illustrated in FIG. 2. For example, the lenticular lens array 114 may comprise a total of 2500 lenticular spherical lenses per square inch, 50 lenses wide by 50 lenses high per inch in each direction.

Each of the lenticular lenses of array 114 focuses the light waves received from the message bearing screen 116 on the message receiving plane 115. Divisional block A of message bearing screen 116 is shown in enlarged form in FIG. 3. It is illustrated as comprised of 36 sub-divisional areas in a six-by-six pattern, corresponding to the 36 spherical lenses in the lenticular lens array 114. Ignoring for the moment the lenticular lens array 114, the pattern of 36 sub-divisional areas, into which block A is indicated in FIG. 3 to be divided, would be focused by the lens No. 1 of plate 113 on the message receiving plane 115 as indicated by the six-by-six pattern identified in FIG. 2 by the heavier lines and identified by the small letters. When, however, the lenticular lens array 114 is in place, the light rays from each of the 36 sub-divisional areas of block A would be focused in the lower right corner of each of the 36 sub-divisional areas of 115, identified by the small letters *a*–*g*, etc. Each of these 36 sub-divisions may be further considered to be sub-divided into nine sub-sub-divisional areas in a three-by-three pattern determined by the coding plate lens array 113. Thus, the light rays from sub-divisional area *a* of block A would be focused by the lens No. 1 of the coding plate 113 and by the lower right lens of the lenticular lens array 114 as a spot in the lower right one of the nine sub-sub-divisional areas of sub-divisional area *a* of 115. Similarly, the light received from sub-divisional block *a* of divisional block K of FIG. 4 would be focused, by the lens No. 9 of code plate 113 and by the same lenticular lens located in the lower right corner of array 114 as just referred to above, as a spot in the upper left corner of the sub-division *a* of plane 115.

In similar manner, each sub-division *a* of each of the main division blocks A through K of 116 would be focused by the particular lens of code plate 113 associated with that particular divisional block, and by one of the lenticular lenses of 114 as spots in different ones of the nine sub-sub-divisions of sub-division *a* of 115. This is illustrated in enlarged form in FIG. 5. There sub-division *a* of plane 115 is seen to comprise nine sub-sub-divisions in a three-by-three array, each identified by a numeral and a letter. The numeral corresponds to the particular lens of code plate 113 which focuses the particular sub-division *a* of the nine divisional blocks A–K of 116 on the area identified as *a* on message receiving plane 115. In the absence of the lenticular lens array 114, the information conveyed by the rays passing through each of the nine lenses in code plate 113 originating at sub-division *a* of each of the blocks A–K would be superimposed upon each other in the sub-divisional area *a* of plane 115. However, with the lenticular lens array 114 in place, the light rays from each sub-divisional area *a* of the blocks A–K passing through each of the respective small lenses of the code plate 113 is focused at each of nine different elemental spots in an arrangement corresponding to that of the lenses of the code array 113.

Summarizing briefly, the message receiving plane 115 subdivides into as many areas as there are spherical lenses in the lenticular lens array 114, and each of these sub-divisions divides into as many sub-sub-divisions as there are lenses in the code plate lens array 113, and in a similar arrangement.

To pursue the matter a little further, consider the four sub-divisions *a*, *b*, *g*, and *h* of block A of 116 as seen in FIG. 3. The light rays from the sub-divisions *a*, *b*, *g*, *h* pass through the small lens No. 1 of coding plate 113 and, in the absence of the lenticular lens array 114, would be so focused by lens No. 1 on plane 115 as to cover the area occupied by the four sub-divisions *a*, *b*, *g*, and *h* of 115. However, with the lenticular lens array 114 in position, the four spherical lenses located in the lower right corner region of 114 would focus the light from each of the sub-divisions *a*, *b*, *g*, and *h* of block A into four elemental spots, one each in the sub-sub-division occupying the lower right corner of each of the four sub-divisional blocks *a*, *b*, *g*, and *h*.

It will be seen then that as a result of the combination of code plate lens array 113 and lenticular lens array 114, the nine letters A–K of the message plate 116 are inverted and superimposed upon each other in an interlaced fashion on the message receiving plane 115, with no elemental spot of any letter superimposed upon any other elemental spot of any other letter. It will further be seen that the information which is thus interlaced is dependent upon the arrangement of the lenses in the code plate lens array and that the number of elemental spots is controlled by the number of the lenticular lenses in array 114.

It will also be seen that if message plane 115 be a photosensitive film, a permanent record may be made of the interlaced spotted arrangement. It is this sort of film record which comprises the coded record information, adapted to being decoded by reversing the procedure just described. Of course, if the plane 115 be photographic film, the dark areas in the message plate 116 would appear as light areas in the developed negative, rather than as dark areas as illustrated in FIG. 2.

To decode the coded information, the procedure just described is reversed. A light source and a diffusion plate is employed to pass light through the film 115 (containing the coded information in interlaced spotted form) toward the message plate 116. The lenticular lens array 114 and the code plate lens array 113 must, of course, coincide exactly with that used in the making of the coded film 115. To trace a few of the light rays in the direction now being discussed, consider the light rays passing through the four contiguous sub-sub-divisional areas of sub-division *a* of plane 115, labeled 1A, 2B, 4D, and 5E in FIG. 5. The light rays from each of these four areas would be focused, by the four lenticular lenses occupying the lower right corner region of array 114, to each of the four small lenses Nos. 1, 2, 4, and 5, respectively, of the code plate 113, and each of these four small lenses would focus the light rays on the spaced-apart sub-divisional areas *a* of the four divisional blocks A, B, D, and E, respectively, of 116. Thus, the four contiguous elemental bits of information 1A, 2B, 4D, and 5E of area *a* on the coded message plate 115 (FIG. 5) are distributed by the decoding system to the four spaced-apart areas *a* on blocks A, B, D, and E.

Consider now the light rays passing from the light source and diffusion plate through the four spaced-apart sub-sub-divisional areas each labeled 1A in FIG. 5 and identified respectively with sub-divisional areas *a*, *b*, *g*, and *h*. All of these light rays would be focused, by the four lenticular lenses occupying the lower right corner region of array 114, on small lens No. 1 of 113 and lens No. 1 would focus these light rays onto the four contiguous sub-divisional areas *a*, *b*, *g*, and *h* of block A of 116. Thus, the four spaced-apart elemental spots of information on the coded message plate 115 are brought together into contiguous positions on the message plane 116 by the decoding system.

The foregoing is an explanation of how the original information at 116 is coded at 115, and how the coded information at 115 is decoded for presentation at 116.

Referring now to FIG. 1, pinhole 25 of code plate lens array 13 will be recognized as corresponding to pinhole or small lens 8 of the code plate lens array 113 of FIG. 2, and message screen 116 of FIG. 2 will be recognized as corresponding to the information presented to screen area 16 by the tape 26 of FIG. 1. Thus, the explanation given above with regard to FIGS. 2–5 of the additional sheet of drawing is applicable in all respects to FIG. 1.

It can be seen that a large number of coding arrangements can be supplied by a simple coding plate lens array 13, so that the code would be hard to break even with similar decoding equipment. The number of geometrical combinations of coding equipment possibilities also is very large, because of choice of spacing of lenses, focal distances, geometric viewing angles and number of multiplexed dots per segment.

Accordingly, novel and useful coding apparatus is disclosed, which has features of novelty as defined in the appended claims.

What is claimed is:

1. An encoding transcriber comprising in combination, a planar message source, a planar illumination source disposed contiguous to the message source plane, an encoding plate comprising lenses disposed at preselected positions in the plate, a multiplexing array comprised of a large number of miniscule lenses located in a planar arrangement, said encoding plate interposed between said message source and the multiplexing array to permit a plurality of separate light paths to be disposed upon the multiplexing array from various sections of the message source, and a message receiving medium disposed in a plane receiving light from the miniscule lenses thereby to break up the pattern of the message source into a plurality of discrete segments each bearing a pattern similar in form to the layout of lenses in the encoding plate.

2. A decoding device comprising in combination, an encoded planar message bearing medium, a first decoding array comprised of miniscule lenses located in a planar array, a second decoding array comprised of a set of geometrically disposed lenses, a planar message viewing screen disposed to receive a plurality of ray paths through both the first and second decoding arrays, and a light source located for projecting the message on said medium through the lenses to appear on said viewing screen.

3. Coding equipment comprising in combination, a lenticular lens array, a coding lens array having a plurality of lenses positioned in a geometric pattern, a message bearing medium and a message presentation area disposed on opposite sides of both the lens arrays to optically project the one surface upon the other, whereby messages may be encoded by projecting from the message presentation area onto the message bearing medium in multiple paths a message broken down into coded form or transversely may be decoded by projecting from said medium to the message presentation area.

4. Encoding apparatus comprising in combination, a message area, a pinhole encoding plate having a plurality of pinholes located in coded positions to view various portions of the message area simultaneously, a lenticular lens array arranged to view the pinhole camera plate for projecting messages from the various pinholes into discrete positions, and a message surface located at the discrete positions for receiving messages in coded form.

5. Decoding apparatus comprising in combination, a message viewing area, a pinhole encoding plate having a plurality of pinholes located in coded positions to view various portions of the message area, a lenticular lens array located to view the pinhole encoding plate, a message bearing medium located for projection by said lenticular lens array through said pinhole encoding plate to the message viewing area.

6. Coding means comprising an array of two spaced sets of multiple lenses, the first for viewing and breaking up an optical image into a set of discrete segments, and the second for viewing the first lens set and intermixing the segments in a complex pattern.

7. A planar original-message surface area; an encoding small-lens array; a lenticular lens array; and a planar coded-message surface area; said encoding small-lens array and said lenticular lens array being so disposed in series between said original-message area and said coded-message area that each lens of said small-lens array focuses a different portion of said original-message area upon the total lenticular array in superimposed fashion and said lenticular lens array focuses the superimposed unintelligible message upon the entire of said coded-message area but in the form of interlaced elemental spots.

References Cited in the file of this patent

UNITED STATES PATENTS

| | | |
|---|---|---|
| 2,086,182 | Dvornik | July 6, 1937 |
| 2,167,107 | Dvornik | July 25, 1939 |
| 2,794,977 | Stoddart | June 4, 1957 |
| 2,833,176 | Ossoinak | May 6, 1958 |
| 2,943,533 | Goodbar | July 5, 1960 |
| 2,950,644 | Land et al. | Aug. 30, 1960 |
| 2,981,140 | Ogle | Apr. 25, 1961 |